United States Patent
Kawabe et al.

(10) Patent No.: US 7,055,502 B1
(45) Date of Patent: Jun. 6, 2006

(54) SINGLE CYLINDER ENGINE AND VEHICLE PROVIDED WITH THE SAME

(75) Inventors: Hideaki Kawabe, Shizuoka (JP); Kaoru Honda, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/197,804

(22) Filed: Aug. 5, 2005

(51) Int. Cl.
*F02P 5/00* (2006.01)
*G06F 19/00* (2006.01)

(52) U.S. Cl. .................. 123/406.51; 123/399

(58) Field of Classification Search .............. 123/21, 123/406.5, 406.51, 406.52, 399, 302, 306, 123/308, 403, 399.1, 339.11, 406.46, 406.47, 123/376, 436
See application file for complete search history.

(56) References Cited

U.S. PATENT DOCUMENTS

| | | | |
|---|---|---|---|
| 4,448,163 A | | 5/1984 | Yoshida |
| 5,070,840 A * | 12/1991 | Kanno et al. .......... 123/406.51 |
| 5,090,380 A * | 2/1992 | Suzuki et al. .......... 123/339.13 |
| 5,359,972 A | 11/1994 | Isaka |
| 5,558,061 A * | 9/1996 | Suminski ............... 123/306 |
| 5,564,383 A * | 10/1996 | Isaka et al. ............ 123/306 |
| 5,640,941 A * | 6/1997 | Hazen et al. ........... 123/306 |
| 6,098,591 A * | 8/2000 | Iwata .................... 123/339.11 |
| 6,213,090 B1 * | 4/2001 | Tamai et al. ........... 123/308 |
| 6,220,904 B1 * | 4/2001 | Hoshiba et al. ........ 440/1 |
| 6,234,147 B1 * | 5/2001 | Hirakata et al. ....... 123/406.51 |
| 6,276,330 B1 * | 8/2001 | Adamisin et al. ...... 123/308 |
| 6,394,066 B1 * | 5/2002 | Chou et al. ............ 123/308 |
| 6,431,140 B1 * | 8/2002 | Nishimura et al. .... 123/306 |
| 6,615,795 B1 * | 9/2003 | Martin et al. .......... 123/308 |
| 6,626,145 B1 * | 9/2003 | Enoyoshi et al. ...... 123/406.24 |
| 6,655,347 B1 * | 12/2003 | Takamiya et al. ...... 123/306 |
| 6,666,186 B1 * | 12/2003 | Laimbock ............... 123/302 |
| 6,742,502 B1 * | 6/2004 | Nagatsu et al. ........ 123/406.24 |
| 6,845,749 B1 * | 1/2005 | Kubo .................... 123/339.11 |
| 6,892,702 B1 * | 5/2005 | Isoda et al. ........... 123/406.24 |
| 6,895,927 B1 * | 5/2005 | Fuwa .................... 123/336 |
| 2003/0140895 A1 * | 7/2003 | Nicolaou et al ....... 123/406.21 |
| 2004/0221834 A1 * | 11/2004 | Miyamoto et al. ..... 123/399 |
| 2005/0011494 A1 * | 1/2005 | Nickel .................. 123/406.46 |
| 2005/0115540 A1 * | 6/2005 | Yi ........................ 123/308 |

FOREIGN PATENT DOCUMENTS

| | | | |
|---|---|---|---|
| JP | 4-164155 | * | 6/1992 |
| JP | 7-317638 | * | 12/1995 |
| KR | 20003048796 | * | 6/2003 |

* cited by examiner

*Primary Examiner*—Hai Huynh
(74) *Attorney, Agent, or Firm*—Keating & Bennett, LLP

(57) ABSTRACT

A single cylinder engine includes an engine body having a cylinder and a combustion chamber, an intake opening that faces the combustion chamber, and an intake passage in communication with the combustion chamber through the intake opening, a piston provided in the cylinder, an ignition plug arranged in a position within about 5% of a bore diameter of the cylinder from an axis of the cylinder, a throttle valve provided in the intake passage, a sensor that detects an opening degree of the throttle valve, and an ECU that causes the ignition plug to lag in ignition timing during two or three cycles when the throttle valve is increased in opening degree from an idling state.

10 Claims, 11 Drawing Sheets

SINGLE CYLINDER ENGINE AND VEHICLE PROVIDED WITH THE SAME

BACKGROUND OF THE INVENTION

1. Field of the Invention

The present invention relates to a single cylinder engine and a vehicle provided with the same.

2. Description of the Related Art

Conventionally, it is known that knocking is liable to occur at the time of acceleration in an engine mounted on a vehicle. There is proposed an ignition timing control device that inhibits knocking at the time of acceleration. For example, the specification of U.S. Pat. No. 4,448,163 discloses a control device that causes an ignition timing to lag by a predetermined number of cycles when stepping on an accelerator pedal at the time when a vehicle is stopped or at the time of steady running.

The control device applies to vehicles accelerated by stepping on an accelerator pedal, such as, automobiles. The control device is considered to apply to multi-cylinder engines.

On the other hand, single cylinder engines having only a single cylinder are known apart from multi-cylinder engines. Single cylinder engines are different in quality from multi-cylinder engines, and the control device is not always able to effectively prevent knocking at the time of acceleration in single cylinder engines.

SUMMARY OF THE INVENTION

In order to overcome the problems described above, preferred embodiments of the present invention provide a single cylinder that effectively prevents knocking at the time of acceleration.

A single cylinder engine according to a preferred embodiment of the present invention includes an engine body including a cylinder, a combustion chamber, an intake opening that faces the combustion chamber, an intake passage in communication with the combustion chamber through the intake opening, a piston provided in the cylinder, an ignition plug arranged in a position within about 5% of a bore diameter of the cylinder from an axis of the cylinder, a throttle valve provided in the intake passage, a detection device that detects an opening degree of the throttle valve, and a control device that causes the ignition plug to lag in ignition timing during two or three cycles when the opening degree of the throttle valve is increased from an idling state.

With the single cylinder engine, the ignition timing is caused to lag during two or three cycles at the time of acceleration starting from an idling state. Also, since offset of the ignition plug from an axis of the cylinder is small (including the case where offset is zero), ignition occurs in the vicinity of the axis of the cylinder. Accordingly, knocking in the single cylinder engine at the time of acceleration can be effectively prevented by the synergistic effect of inhibition of knocking due to lag in ignition timing and inhibition of knocking due to ignition in the vicinity of the axis of the cylinder. Since lag in ignition timing amounts only to two or three cycles, there is no fear of negatively affecting the acceleration characteristics. The "idling state" referred to herein means a state in which coupling between an engine and an object driven by the engine is disconnected.

Other features, elements, characteristics and advantages of the present invention will be apparent from the following detailed description of preferred embodiments with reference to the attached drawings.

DETAILED DESCRIPTION OF PREFERRED EMBODIMENTS

Figure 1:
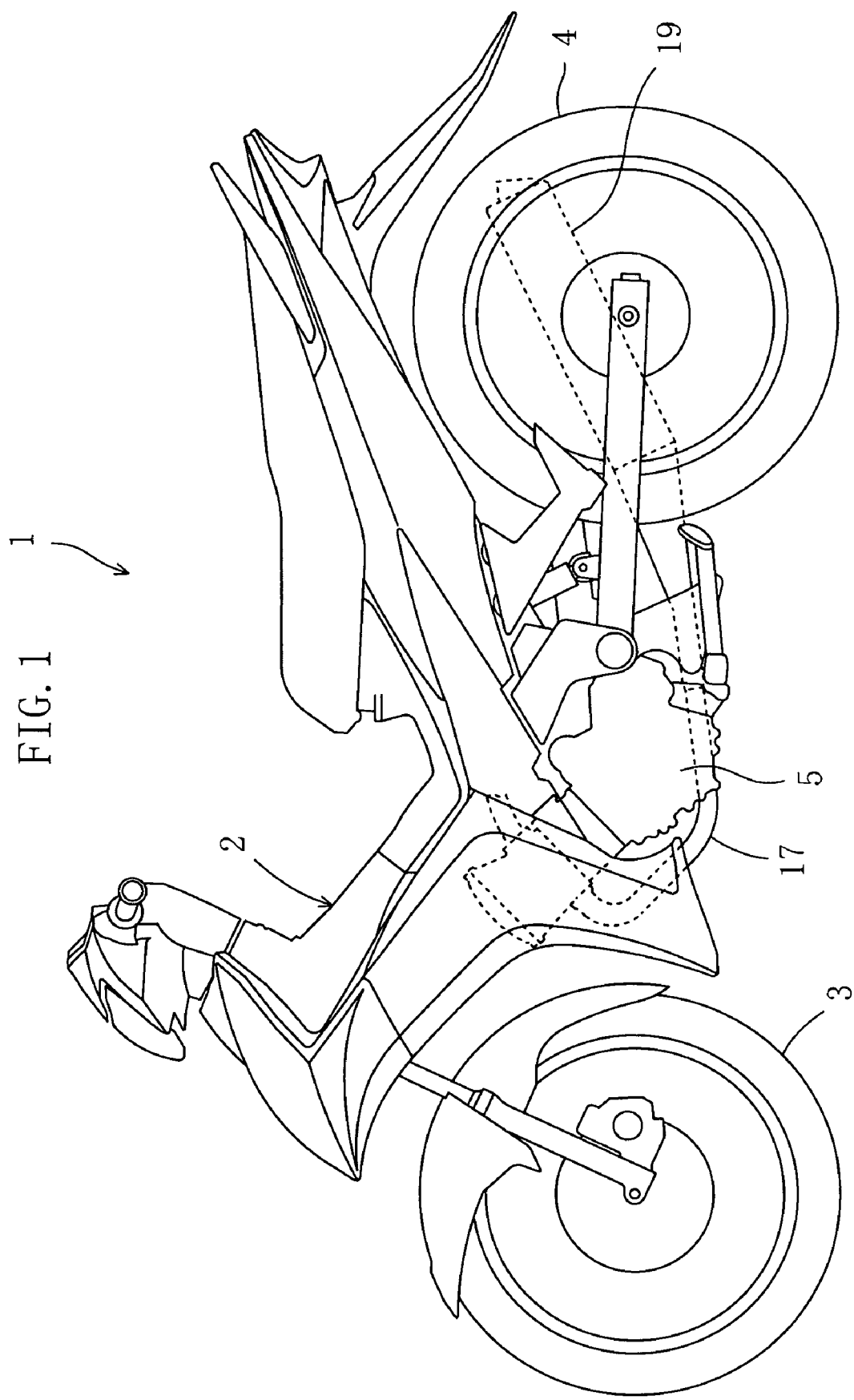
FIG. 1 is a side view showing a motorcycle.

As shown in FIG. 1, a vehicle according to a preferred embodiment includes a motorcycle 1. However, vehicles according to the preferred embodiments of the present invention are not limited to the motorcycle 1. The vehicle according to preferred embodiments of the present invention may be other saddle-ride type vehicles or other vehicles that are not saddle-ride type vehicles. In addition, "motorcycle" includes a scooter, etc. in addition to so-called motorbikes.

The motorcycle 1 includes a vehicle body 2, a front wheel 3 and a rear wheel 4 mounted to the vehicle body 2, and an engine 5 that drives the rear wheel 4 through a drive chain (not shown). In the present preferred embodiment, the engine 5 preferably includes a single-cylinder 4-cycle internal combustion engine.

Figure 2:
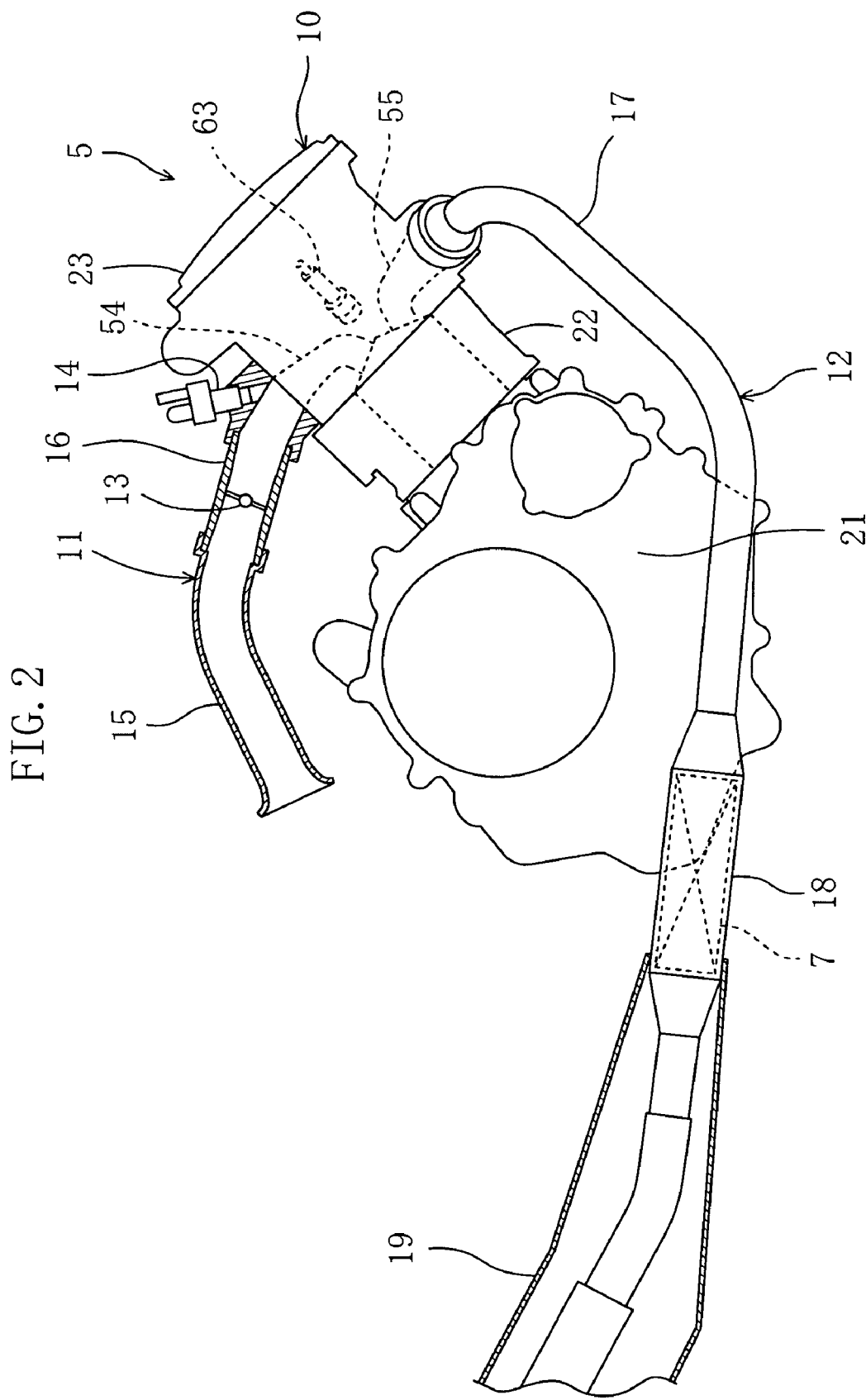
FIG. 2 is a view showing the construction of an engine.

As shown in FIG. 2, the engine 5 includes an engine body 10, an intake passage 11, and an exhaust passage 12. The engine body 10 includes a crankcase 21, in which a crankshaft 42 (see FIG. 3) or the like is accommodated, a cylinder 22 unified with the crankcase 21, and a cylinder head 23 mounted to the cylinder 22. According to the present preferred embodiment, the crankcase 21 and the cylinder 22 are unified with each other to form a cylinder block. However, the crankcase 21 and the cylinder 22 may be formed separately and assembled to each other.

The intake passage 11 includes an intake pipe 15 connected to an air cleaner (not shown), a throttle body 16, and intake ports 54 formed in the cylinder head 23. A downstream end of the intake pipe 15 is connected to an upstream end of the throttle body 16, and a downstream end of the throttle body 16 is connected to the cylinder head 23. A throttle valve 13 is provided in the throttle body 16. An injector 14 is mounted to the cylinder head 23. That is, the injector 14 is arranged downstream of the throttle valve 13 in the intake passage 11. Accordingly, the injector 14 injects fuel between the throttle valve 13 and an intake opening 52 (see FIG. 3), described later.

The exhaust passage 12 includes exhaust ports 55 formed in the cylinder head 23, an exhaust pipe 17 connected to the cylinder head 23, a catalyst casing 18 provided on the exhaust pipe 17, and a muffler 19 provided on a tip end of the exhaust pipe 17. A ternary catalyst 7 is accommodated in the catalyst casing 18.

Figure 3:
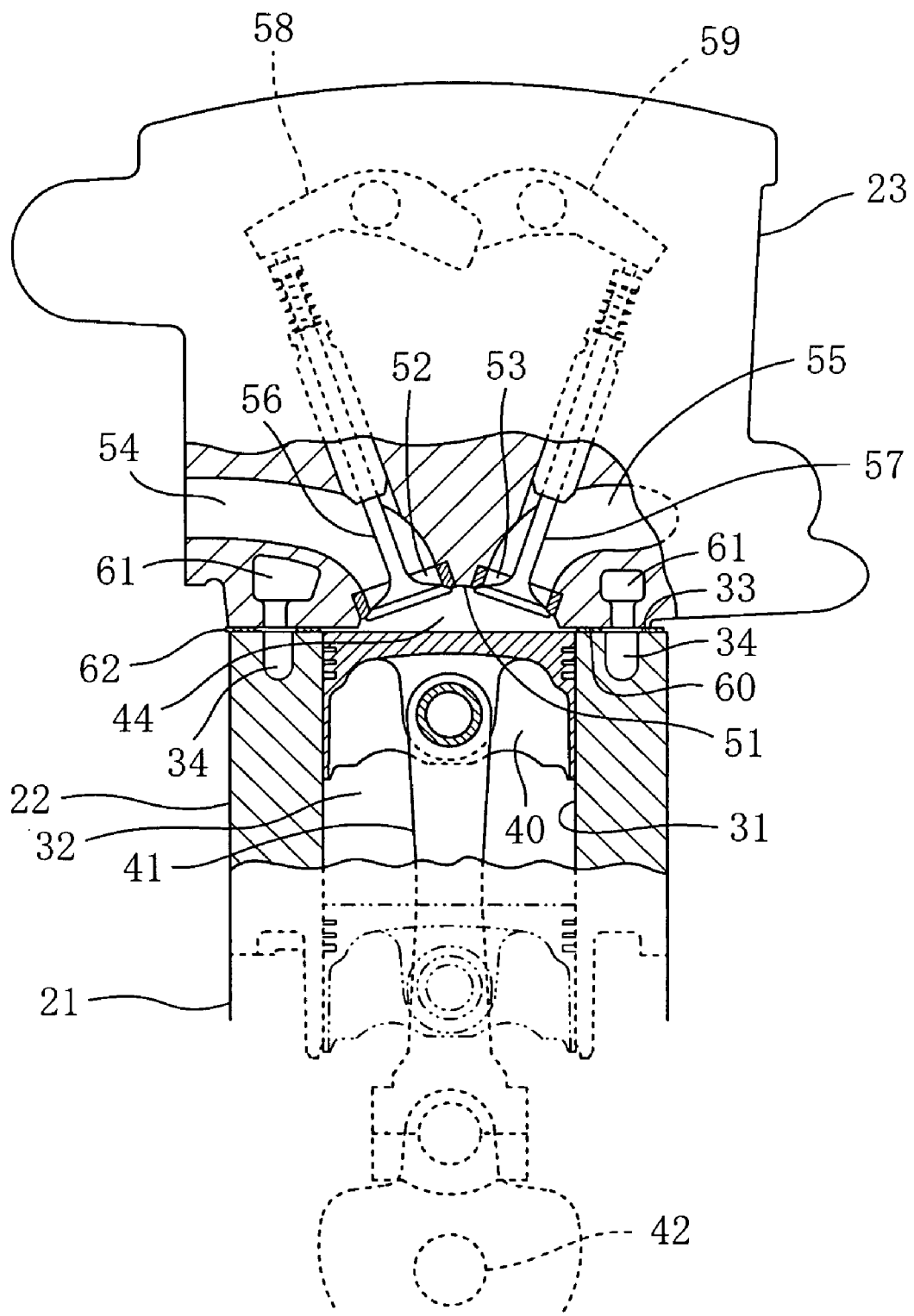
FIG. 3 is a cross sectional view showing an essential part of the engine.

As shown in FIG. 3, a columnar-shaped cylinder chamber 32 includes a cylinder inner surface 31 in the cylinder 22, and a piston 40 is accommodated in the cylinder chamber 32. The piston 40 is connected to a connecting rod 41, and the connecting rod 41 is connected to the crankshaft 42. A water jacket 34 is formed on an upper surface 33 of the cylinder 22, that is, a surface opposed to the cylinder head 23. The water jacket 34 is arranged to surround a periphery of the cylinder chamber 32 as viewed in a longitudinal direction of the cylinder 22 (a vertical direction in FIG. 3).

A pent roof type recess 51 is formed on a lower surface of the cylinder head 23, that is, a head inner surface 60, to cover an upper portion of the cylinder chamber 32. However, the recess 51 is not limited in shape but may be, for example, hemi-spherical, multi-spherical, or other suitable shape. A combustion chamber 44 is defined by the recess 51, the cylinder inner surface 31, and an upper surface of the piston 40.

The compression ratio of the engine 5 is preferably set to be about 12, for example. However, the compression ratio may be greater than about 12.

Figure 4:
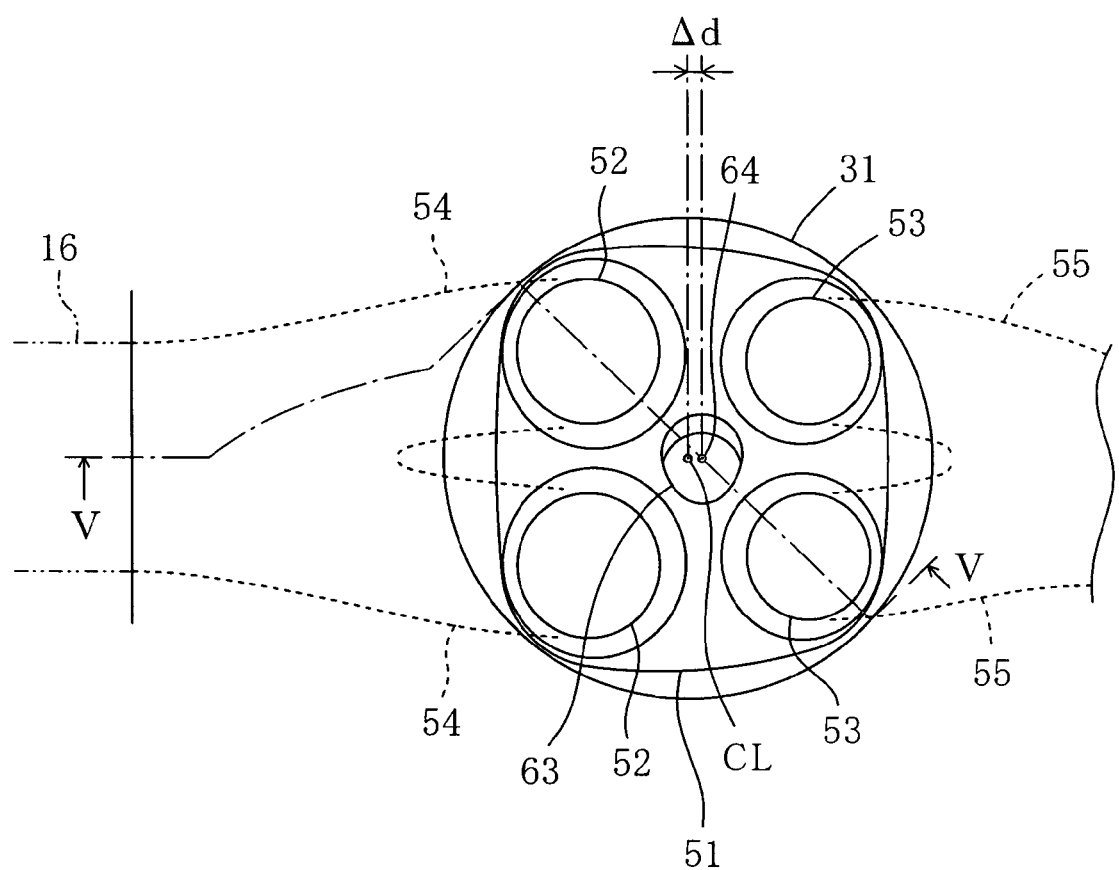
FIG. 4 is a bottom view showing a cylinder head.

As shown in FIG. 4, the recess 51 is preferably formed with two intake openings 52 and two exhaust openings 53, for example. Both intake openings 52 are formed toward the rear (a left side in FIG. 4) of the vehicle body 2 to be aligned in a left and right direction (a vertical direction in FIG. 4) of the vehicle body 2. Both exhaust openings 53 are formed toward the front (a right side in FIG. 4) of the vehicle body 2 to be aligned in the left and right direction of the vehicle body 2. The intake openings 52 and the exhaust openings 53 are located at positions offset from a cylinder axis CL and arranged so as to surround the cylinder axis CL. In addition, the intake openings 52 preferably have a larger area than the exhaust openings 53.

As shown in FIG. 3, the cylinder head 23 is formed with intake ports 54 in communication with the combustion chamber 44 through the respective intake openings 52 and the exhaust ports 55 are in communication with the combustion chamber 44 through the respective exhaust openings 53. As shown in FIG. 4, the intake ports 54 join together to be connected to the throttle body 16. The exhaust ports 55 join together to be connected to the exhaust pipe 17.

As shown in FIG. 3, provided in the cylinder head 23 are intake valves 56 that open and close the intake openings 52, and exhaust valves 57 that open and close the exhaust openings 53. The intake valves 56 and the exhaust valves 57 are biased in directions in which the intake openings 52 and the exhaust openings 53 are closed. Rocker arms 58, 59 are provided in the cylinder head 23 and periodically open and close the intake valves 56 and the exhaust valves 57, respectively. However, a valve operating mechanism that opens and closes the intake valves 56 and the exhaust valves 57 is in no way limitative.

A water jacket 61 is formed on the inner surface 60 of the cylinder head 23. The water jacket 61 is located at a position corresponding to the water jacket 34 of the cylinder 22. A gasket 62 is interposed between the cylinder head 23 and the cylinder 22. The gasket 62 is formed with a plurality of holes (not shown) that provide for communication between the water jacket 61 of the cylinder head 23 and the water jacket 34 of the cylinder 22.

Figure 5:
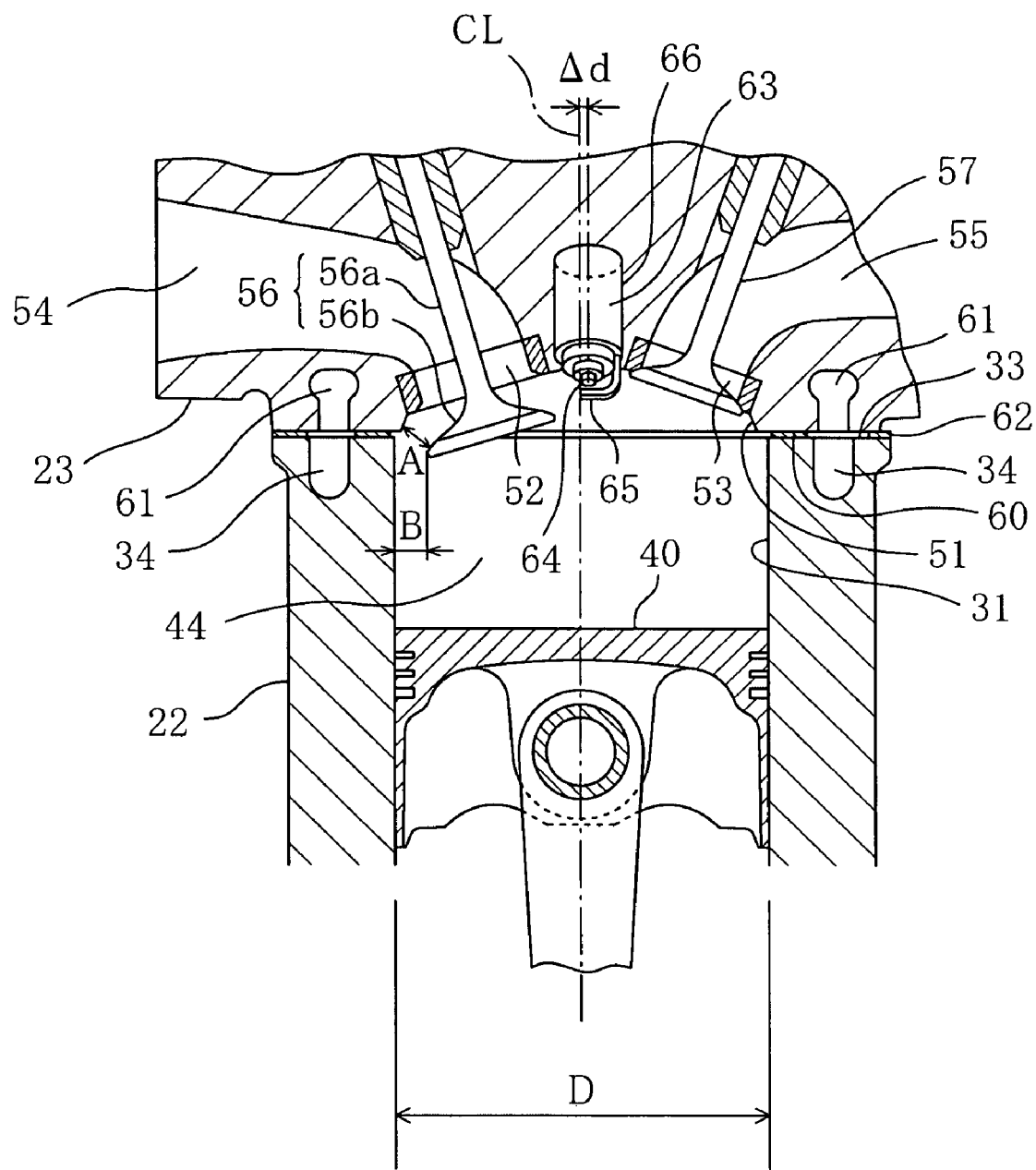
FIG. 5 is a cross sectional view taken along the line V—V in FIG. 4.

As shown in FIG. 5, the intake ports 54 are preferably defined by a so-called tumble port, for example. More specifically, the intake ports 54 define flow passages that cause an air-fuel mixture, which is introduced into the combustion chamber 44 through the intake openings 52, to generate vertical vortex flows (tumble flows) in the combustion chamber 44. The intake ports 54 are formed so as to have the air-fuel mixture drifting toward the cylinder axis CL in the intake openings 52. Here, as compared with the exhaust ports 55, the intake ports 54 are formed to be relatively straight in regions (upstream regions) distant from the combustion chamber 44 and curved relatively acutely in regions (downstream regions) near to the combustion chamber 44.

However, the intake ports 54 do not necessarily include a tumble port but may include a port or the like that forms transverse vortex flows, that is, swirl flows within the combustion chamber 44. The intake ports 54 preferably include a flow passage that is liable to generate vortex flows in the combustion chamber 44, but may include a flow passage that does not generate vortex flows. The intake ports 54 are not limited to this specific configuration.

In addition, "cylinder axis CL" herein means a region except the vicinity of the cylinder inner surface 31 and means a relatively wide region. Accordingly, for example, the upwardly left intake opening 52 in FIG. 4, "drifting toward the cylinder axis CL" referred to herein includes not only having the air-fuel mixture drifting rightward and obliquely downward in FIG. 4, but also having the air-fuel mixture drifting rightward (toward the exhaust opening 53) and having the air-fuel mixture drifting downward (toward the other intake opening 52).

As shown in FIG. 5, the intake valves 56 preferably include a shank 56a and an umbrella portion 56b provided at a tip end of the shank 56a. The exhaust valves 57 preferably have the same structure as that of the intake valves 56.

As shown in FIG. 5, when the intake valves 56 are opened, clearances are formed between the recess 51 of the cylinder head 23 and the intake valves 56 (more specifically, the umbrella portions 56b of the intake valves 56). The air-fuel mixture flows into the combustion chamber 44 through the clearances from the intake ports 54. While the clearances are preferably formed all around the umbrella portions 56b of the intake valves 56, the clearances are preferably smallest in the vicinity of the cylinder inner surface 31.

In the present preferred embodiment, when the intake valves 56 are opened, minimum clearances A between the intake valves 56 and the recess 51 become substantially equal to or larger than clearances (in other words, clearances between the intake valves 56 and the cylinder inner surface 31 as viewed in an axial direction of the cylinder) between the intake valves 56 and the cylinder inner surface 31 in a diametrical direction (that is, a diametrical direction of the cylinder 22) of the combustion chamber 44. In this manner, according to the present preferred embodiment, the intake valves 56 are provided at positions close to the cylinder inner surface 31 and the intake openings 52 are provided at positions close to the cylinder inner surface 31, as viewed in the axial direction of the cylinder. Therefore, an excess space corresponding to amounts by which the intake valves 56 and the intake openings 52 are close to the cylinder inner surface 31, is produced in a central region of the recess 51 of the cylinder head 23. In addition, while values of the clearances A and the clearances B are not specifically limiting, the clearances A and the clearances B amount to, for example, about 2 mm to about 5 mm. The clearances A and the clearances B may also be about 3 mm to about 4 mm, for example.

The cylinder head 23 is provided with an ignition plug 63. The ignition plug 63 includes a plug body 66, a central electrode 64 provided at a tip end of the plug body 66, and a lateral electrode 65. The central electrode 64 and the lateral electrode 65 project toward the combustion chamber 44 from the recess 51 of the cylinder head 23. Here, the ignition plug 63 is arranged in a position offset toward the exhaust openings 53 from the cylinder axis CL. More specifically, the central electrode 64 of the ignition plug 63 is offset toward the exhaust openings 53 from the cylinder axis CL.

As described above, the intake openings 52 are located at positions close to the cylinder inner surface 31. Therefore, as compared with conventional engines, it is possible in the engine 5 to make a position of the ignition plug 63 offset toward the intake openings 52 by an amount by which the intake openings 52 are offset toward the cylinder inner surface 31. Therefore, it is possible to make a position of the ignition plug 63 approach the cylinder axis CL.

An offset Δd of the ignition plug 63 from the cylinder axis CL is preferably within about 5% of a bore diameter D of the cylinder 22, and especially preferably within about 3%, for example. The bore diameter D may be, for example, about 50 mm to about 60 mm. The offset Δd is less than, for example, about 3 mm and may be equal to or less than about 1.5 mm. Also, the offset Δd may be about 1 mm to about 2 mm. By making the offset Δd small, generation of knocking can be effectively prevented even in combustion at, for example, a theoretical air-fuel ratio or in a lean region. In addition, the offset Δd may be 0. That is, the ignition plug 63 may be arranged on the cylinder axis CL.

With the engine 5, the ignition plug 63 is arranged in the vicinity of the cylinder axis CL, so that it is possible to prevent dispersion in the propagation distance of a combustion flame in the combustion chamber 44, thus minimizing knocking.

Figure 6:
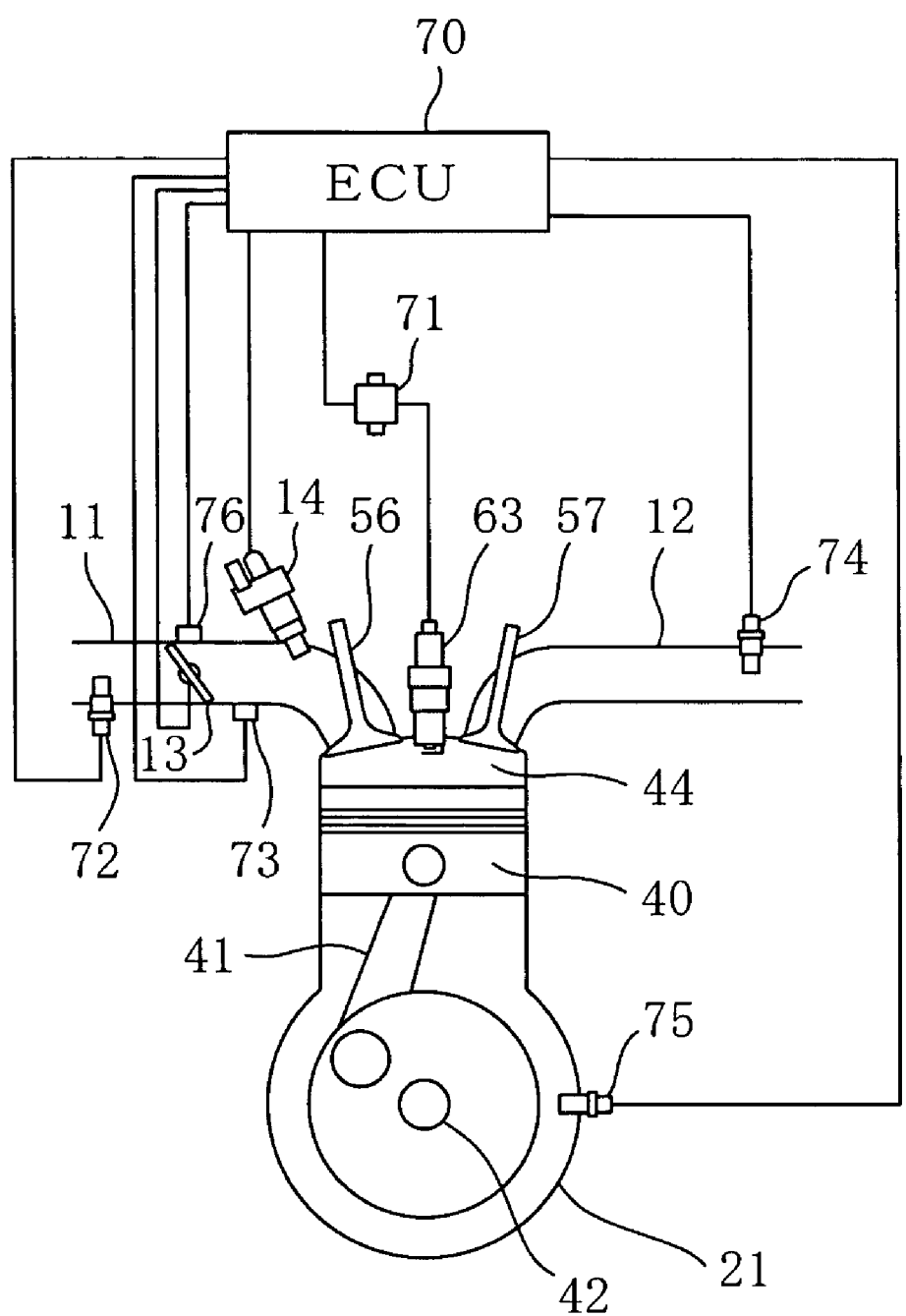
FIG. 6 is a view showing the configuration of a control device for the engine.

As shown in FIG. 6, a temperature sensor 72 that detects temperature in the intake passage 11, a pressure sensor 73 that detects pressure in the intake passage 11, and a throttle position sensor 76 that detects an opening degree of the throttle valve 13, are all preferably provided in the intake passage 11 of the engine 5. The pressure sensor 73 is provided downstream of the throttle valve 13. An $O_2$ sensor 74 is provided in the exhaust passage 12. A crank angle sensor 75 that detects a crank angle is provided in the crankcase 21. The sensors 72 to 76 are connected to an engine control unit (ECU) 70. The ECU 70 is connected to the ignition plug 63 through an ignition coil 71 to control the ignition timing of the ignition plug 63. The ECU 70 is also connected to the injector 14 to control the injection timing of the injector 14.

Figure 7:
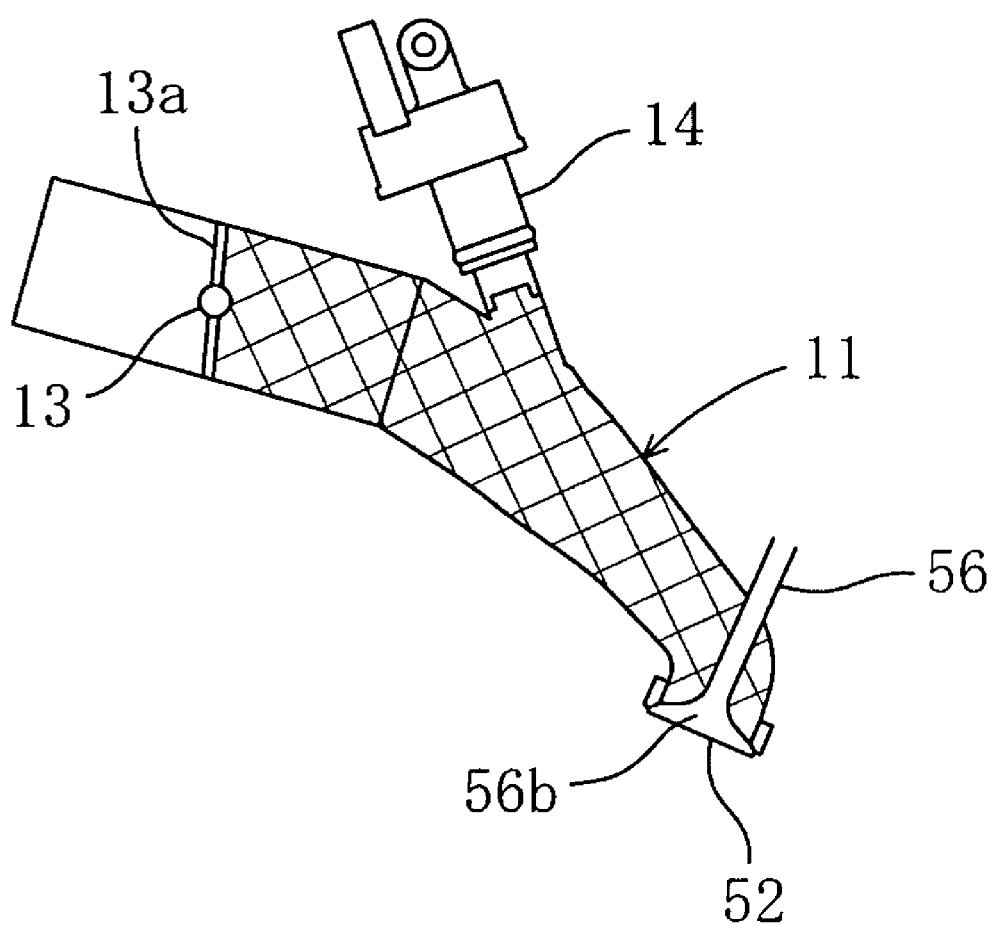
FIG. 7 is a view schematically showing a portion extending from a throttle valve in an intake passage to intake openings.

With the engine 5, a volume ratio $\epsilon = Q/V$ of a volume Q of that portion (strictly, as indicated by cross hatching in FIG. 7, a portion from a downstream outer surface of a valve plate 13a of the throttle valve 13 at a position of a minimum opening degree to an upper surface of the umbrella portions 56b of the intake valves 56 in a closed state) of the intake passage 11, which extends from the throttle valve 13 to the intake openings 52, to a stroke volume V (bore diameter D× stroke of the piston 40) of the cylinder is preferably set to be at most about 0.61, for example.

Figure 8:
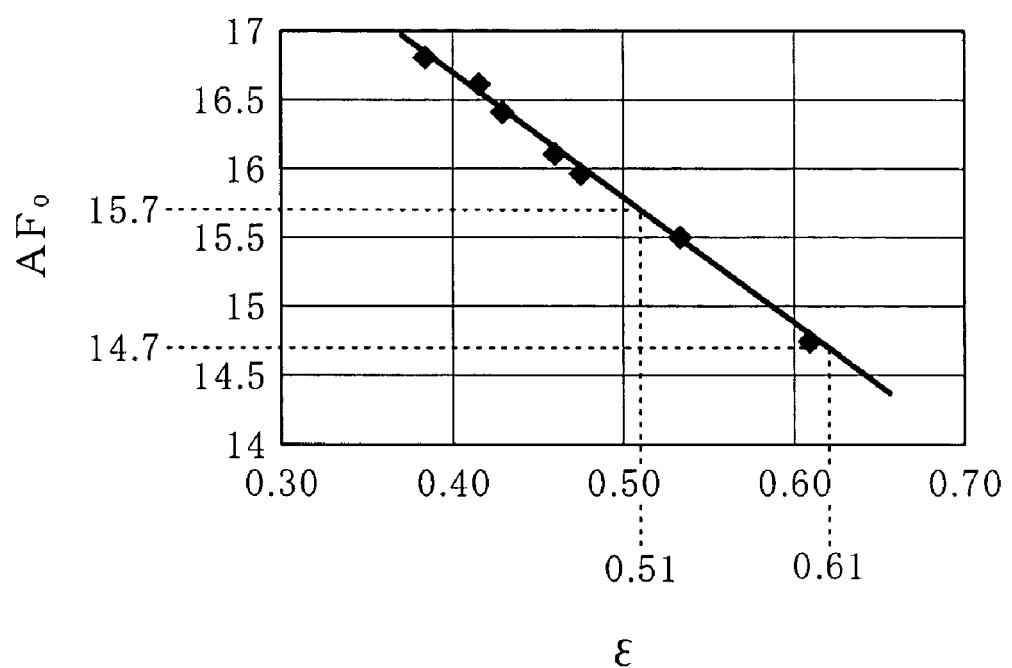
FIG. 8 is a graph illustrating the relationship between a volume ratio and a lean limit air-fuel ratio.

The inventors of the present application have made experiments and simulations to examine the relationship between the volume ratio $\epsilon$ and a lean limit air-fuel ratio $AF_0$. The lean limit air-fuel ratio means a highest (that is, the fuel is thinnest) air-fuel ratio, in which a stable idling operation is possible. Table 1 indicates the results. FIG. 8 shows a characteristic curve (specifically, a straight line) representative of that relationship between the volume ratio $\epsilon$ and the lean limit air-fuel ratio $AF_0$, which has been found on the basis of the experiments and results of simulation. In addition, the volume Q was about 51.5 cc to about 81.6 cc in the experiments and the simulations.

TABLE 1

|  | Volume ratio $\epsilon$ | Lean limit air-fuel ratio $af_0$ |
| --- | --- | --- |
| Experiment | 0.38 | 16.8 |
| Experiment | 0.41 | 16.6 |
| Experiment | 0.53 | 15.5 |
| Simulation | 0.47 | 16.0 |
| Simulation | 0.46 | 16.1 |
| Simulation | 0.43 | 16.4 |
| Simulation | 0.61 | 14.7 |

It is seen from FIG. 8 that the smaller the volume ratio $\epsilon$, the larger the lean limit air-fuel ratio $AF_0$ in idling operation and that when the lean limit air-fuel ratio $AF_0$ is about 14.7 (theoretical air-fuel ratio), the volume ratio $\epsilon$ is about 0.61. Accordingly, by making the volume ratio $\epsilon$ at most about 0.61, idling operation at the theoretical air-fuel ratio can be performed stably. In addition, when the volume ratio $\epsilon$ is made at most about 0.51, the lean limit air-fuel ratio $AF_0$ becomes at least about 15.7, so that an operation at the theoretical air-fuel ratio can be performed with a margin.

With the engine 5, the volume ratio $\epsilon$ is at most about 0.61, and a region of the intake passage 11 downstream of the throttle valve 13 is small in volume. Therefore, the injected fuel is liable to be evenly dispersed in a region of the intake passage 11 downstream of the throttle valve 13. Accordingly, a uniform air-fuel mixture is drawn into the combustion chamber 44. This is considered to be one of the causes of the lean limit air-fuel ratio increasing.

Also, with the engine 5, a region of the intake passage 11 downstream of the throttle valve 13 is small in volume, so that a period of time until pressure in such region is restored to atmospheric pressure after the intake valves 56 are closed is relatively short. Therefore, it is difficult for internal EGR to occur. This is also considered to be one of the causes of the lean limit air-fuel ratio increasing.

The ECU 70 controls the throttle valve 13 or the injector 14 so that an air-fuel ratio amounts substantially to about 14.7 (theoretical air-fuel ratio) not only in steady running but also in idling operation. For example, the ECU 70 adjusts an intake quantity or a fuel injection quantity to thereby control the air-fuel ratio at the time of idling operation to about 14.2 to about 15.2, for example. In this manner, by making the air-fuel ratio substantially equal to the theoretical air-fuel ratio, it is possible to make effective use of the ternary catalyst 7 in the exhaust passage 12 also at the time of idling operation.

Further, at the time of acceleration from the idling state, that is, when the throttle valve 13 is increased in opening degree from the idling state, the ECU 70 causes the ignition timing of the ignition plug 63 to lag during two or three cycles. While a magnitude of lag in ignition timing is not specially limited, the ignition timing after lag is, for example, about 5 degrees before the top dead center of compression (BTDC) to about 15 degrees after the top dead center of compression (ATDC), preferably about 5 to about 15 degrees after the top dead center of compression, more preferably about 7.5 to about 12.5 degrees after the top dead center of compression. According to the present preferred embodiment, the ignition timing after lag is preferably set to about 10 degrees after the top dead center of compression, for example.

In addition, "idling state" referred to herein means a state, in which a coupling between the engine 5 and the rear wheel 4 (drive wheel) is disconnected, specifically, a state in which a clutch provided in a power transmission system between the crankshaft 42 of the engine 5 and the rear wheel 4 is disengaged. Therefore, the idling state includes not only a state (stop idling state) when a vehicle is stopped but also a state (running idling state) in which the clutch is disengaged during running, as at the time of deceleration before stopping. The clutch is not limited in type but may be a manual type clutch (a so-called handle clutch, etc.) operated manually, or an automatic type clutch such as centrifugal clutch, etc.

Further, when an increasing rate (an increasing rate per unit time) of an opening degree of the throttle valve 13 is a predetermined value or more at the time of acceleration from the idling state, the ECU 70 causes the ignition timing to lag and increases a fuel injection quantity of the injector 14 to make an air-fuel ratio that is smaller than the theoretical air-fuel ratio. An air-fuel ratio at the time of such acceleration is, for example, about 11 to about 14, preferably about 12 to about 13. According to the present preferred embodiment, the air-fuel ratio at the time of such acceleration is preferably about 12.5, for example.

Figure 9:
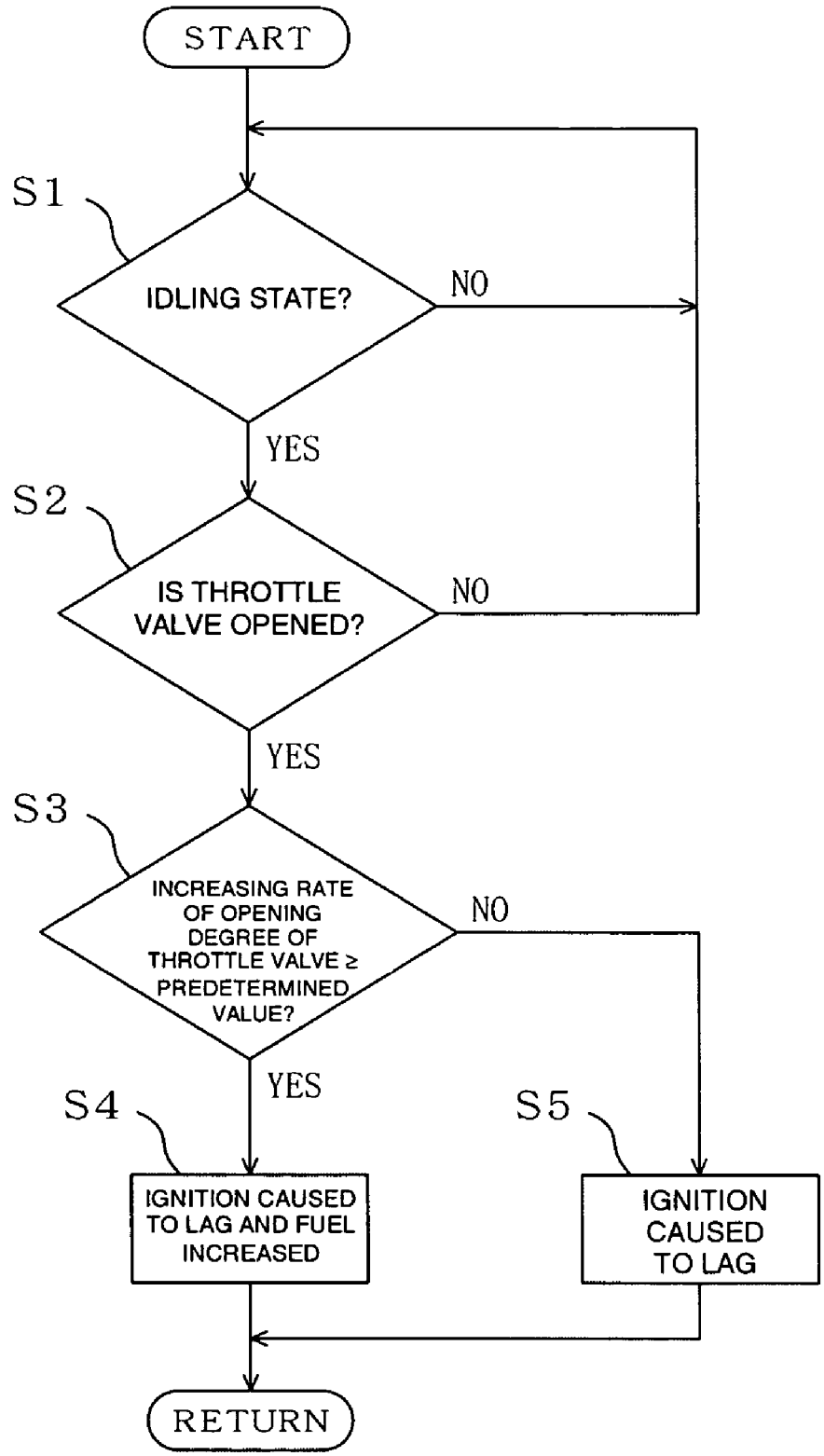
FIG. 9 is a flowchart illustrating control of acceleration from an idling state.

Details of control of acceleration from an idling state will be described below with reference to FIG. 9. First, it is judged in STEP S1 whether the engine 5 is in a no-load state, that is, in an idling state. When the engine 5 is in an idling state, the procedure proceeds to STEP S2 to judge whether the throttle valve 13 is opened. In the case where the throttle valve 13 is opened, the procedure proceeds to STEP S3. In the case where the result of judgment in STEP S1 or STEP S2 is NO, the procedure returns to STEP S1 since the control of acceleration is not necessary.

It is judged in STEP S3 whether an increasing rate of an opening degree of the throttle valve 13 is a predetermined value or more. That is, it is judged whether the throttle valve 13 is rapidly opened. In the case where the result of judgment is YES, the procedure proceeds to STEP S4, and in the case where the result of judgment is NO, the procedure proceeds to STEP S5. In STEP S4, the ignition timing is caused to lag a magnitude corresponding to two or three cycles and a fuel injection quantity from the injector 14 is increased. On the other hand, in STEP S5, the fuel injection quantity is not increased but the ignition timing is caused to lag a magnitude corresponding to two or three cycles.

As described above, with the engine 5, the ignition plug 63 is arranged in the vicinity of the cylinder axis CL and the ignition timing is caused at the time of acceleration beginning from an idling state to lag a magnitude corresponding to two or three cycles. Knocking at the time of acceleration can be effectively prevented by the synergistic effect of a knocking inhibiting effect due to ignition in the vicinity of the cylinder axis CL and a knocking inhibiting effect due to a lag in the ignition timing. In addition, since a lag in the ignition timing at the time of acceleration corresponds to two or three cycles, it is possible to prevent any negative effect on the acceleration characteristics.

Further, with the engine 5, when an increasing rate of an opening degree of the throttle valve 13 is a predetermined value or more at the time of acceleration from the idling state, the ignition timing is caused to lag and a fuel injection quantity from the injector 14 is increased. Therefore, it is possible to further effectively prevent and minimize knocking. Specially, according to the present preferred embodiment, since the air-fuel ratio in the idling state is substantially equal to the theoretical air-fuel ratio, knocking is liable to occur when left intact. Accordingly, the effects of inhibition of knocking are more apparent.

Further, with the engine 5, the intake ports 54 preferably include a tumble port and vortex flows are formed within the combustion chamber 44. Therefore, it is possible to accelerate burning in the combustion chamber 44 to effectively prevent knocking at the time of acceleration. Also, a relatively simple construction makes it possible to form vortex flows in the combustion chamber 44 without incurring an increase in the number of parts.

With the engine 5, the intake openings 52 are close to the cylinder inner surface 31 such that the clearances B between the intake valves 56 and the cylinder inner surface 31 as viewed in the axial direction of the cylinder are equal to or smaller than the minimum clearances A between the intake valves 56 and the recess 51 of the cylinder head 23. Therefore, it is harder for the air-fuel mixture to flow in the intake openings 52 toward the cylinder inner surface 31 than toward the cylinder axis CL. The intake ports 54 are preferably formed in a manner to have the air-fuel mixture drift toward the cylinder axis CL. Therefore, an increase in the quantity of air-fuel mixture drawn toward the cylinder axis CL can compensate for a decrease in the quantity of air-fuel mixture drawn toward the cylinder inner surface 31. Accordingly, it is possible to supply a sufficient quantity of air-fuel mixture to the combustion chamber 44.

Since the air-fuel mixture preferably forms vortex flows in the combustion chamber 44, even the air-fuel mixture inflowing from the intake openings 52 toward the cylinder axis CL becomes liable to flow to the vicinity of the cylinder inner surface 31 after flowing into the combustion chamber 44. Accordingly, the air-fuel mixture is filled relatively evenly in the combustion chamber 44. In this manner, with the engine 5, there is a fear that dispersion in flow rate distribution is produced accompanying drifting of the air-fuel mixture in the intake opening 52, but such dispersion can be dissolved in the combustion chamber 44.

In this manner, the air-fuel mixture flowing into the combustion chamber 44 is caused to drift toward the cylinder axis CL from the intake openings 52 forming vortex flows in the combustion chamber 44. When the ignition plug 63 is ignited in the vicinity of the cylinder axis CL, the synergistic effect thereof makes it possible to improve an anti-knocking quality while preventing reduction in engine output.

Also, with the engine 5, the anti-knocking quality is improved, so that it is possible to increase a compression ratio. Conversely stated, there is less fear of incurring knocking although the compression ratio is large.

With the engine 5, the injector 14 is arranged downstream of the throttle valve 13 and the volume ratio $\epsilon = Q/V$ of a volume Q of that portion of the intake passage 11, which extends from the throttle valve 13 to the intake openings 52, to a stroke volume V of the cylinder 22 is preferably set to be at most about 0.61, for example, whereby it is possible to supply a sufficiently atomized and uniform air-fuel mixture to the combustion chamber 44 during the suction stroke. Accordingly, it is possible to effectively prevent knocking.

As described above, when the intake valves 56 are opened, minimum clearances A between the intake valves 56 and the recess 51 of the cylinder head 23 become equal to or larger than clearances B between the intake valves 56 and the cylinder inner surface 31 in the diametrical direction of the cylinder 22. Therefore, the intake openings 52 are located close to the cylinder inner surface 31, so that it is possible to ensure an excess space in the vicinity of the cylinder axis CL. Accordingly, it becomes easy to arrange the ignition plug 63 in the vicinity of the cylinder axis CL.

According to the present preferred embodiment, however, the clearances A may become smaller than the clearances B when the intake valves 56 are opened. The relationship between the clearances A and the clearances B is in no way limiting.

With the engine 5, a position of the ignition plug 63 is offset from the cylinder axis CL and especially offset toward the exhaust openings 53. Therefore, the open area of the intake openings 52 can be increased as compared with the case where the ignition plug 63 is positioned offset toward the intake openings 52. However, according to the number and arrangement of the intake openings 52 and the exhaust openings 53, a sufficient open area of the intake openings 52 can be ensured even when the ignition plug 63 is offset toward the intake openings 52. In such a case, the ignition plug 63 may be offset toward the intake openings 52.

As described above, the intake ports 54 in the present preferred embodiment preferably include a tumble port. However, the intake ports 54 may be of another type to have the air-fuel mixture drift toward the cylinder axis CL and to generate vortex flows in the combustion chamber 44. The intake ports 54 may include swirl ports to generate transverse vortex flows within the combustion chamber 44. For example, the intake ports 54 may include a type that has the air-fuel mixture introduced in a direction tangent to the cylinder inner surface 31 of the combustion chamber 44.

Also, it is not necessarily required that the vortex flow generating mechanism be constituted only by the intake ports 54. The vortex flow generating mechanism is not limited in specific constitution. For example, the vortex flow generating mechanism may include a closure member (for example, a projection or the like) that partially plugs a flow passage in the intake port 54.

Also, the vortex flow generating mechanism may include a valve, for example, a valve that partially plugs a flow passage in the intake port 54. The vortex flow generating mechanism may include a control valve or a throttle valve described in, for example, the specification and drawings of U.S. Pat. No. 5,359,972. Contents of the specification and drawings of U.S. Pat. No. 5,359,972 are incorporated by reference hereinto.

Figure 10:
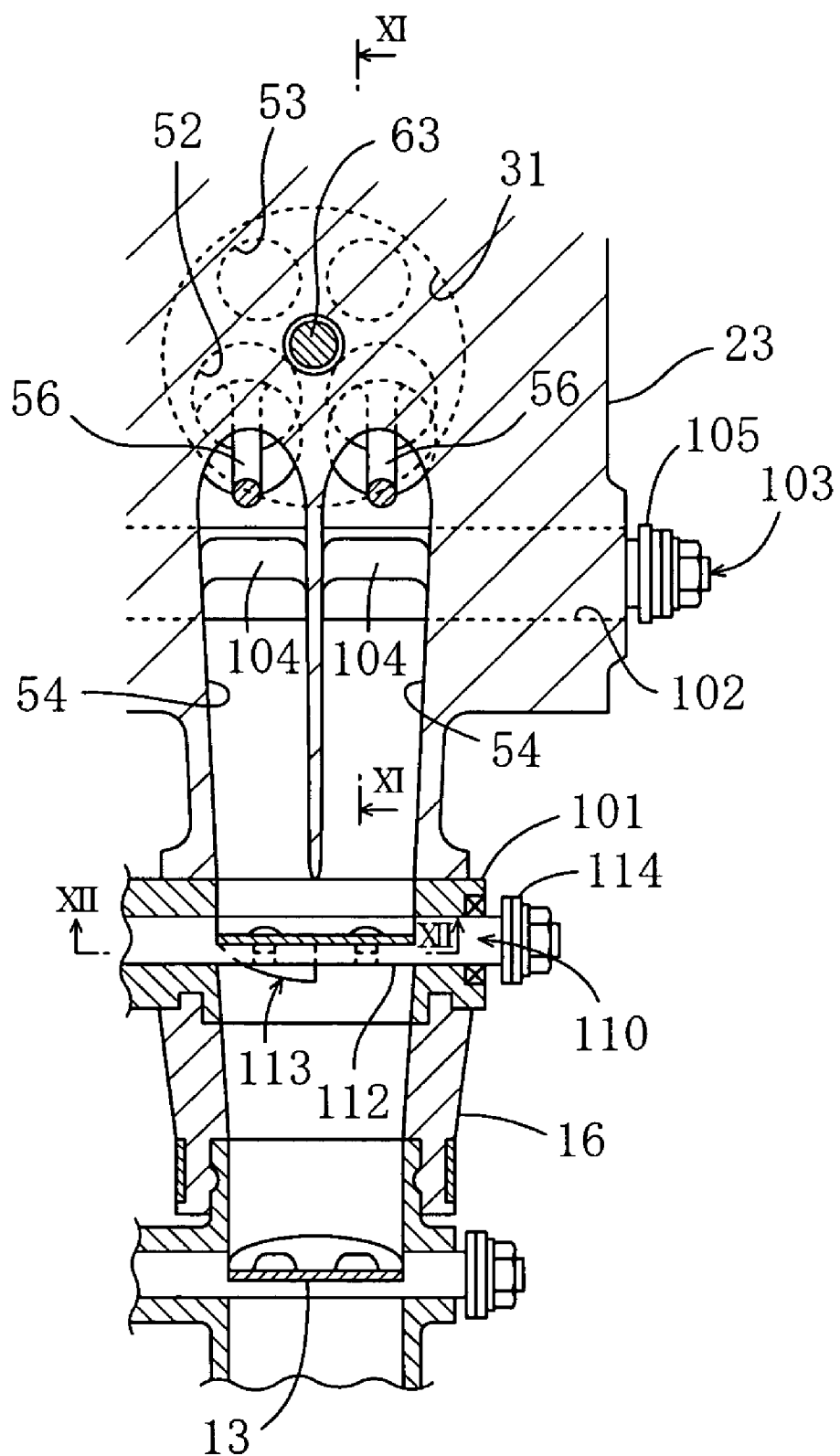
FIG. 10 is a partial, cross sectional view showing an engine according to a modification.

Subsequently, a further present preferred embodiment including a valve to generate vortex flows will be described with reference to FIGS. 10 to 12. As shown in FIG. 10, according to the present preferred embodiment, a further throttle body 101 is provided between the cylinder head 23 and the throttle body 16. The cylinder head 23 is formed with a hole 102 that extends in a direction that is substantially perpendicular to intake ports 54. Provided in the hole 102 is a rotating control valve 103 that varies the intake ports 54 in flow passage area. Formed at a tip end of the control valve 103 is a connection 105, to which a drive cable or the like is connected. The control valve 103 receives a drive force from the drive cable or the like to be rotated, thereby varying the intake ports 54 in flow passage area.

Figure 11:
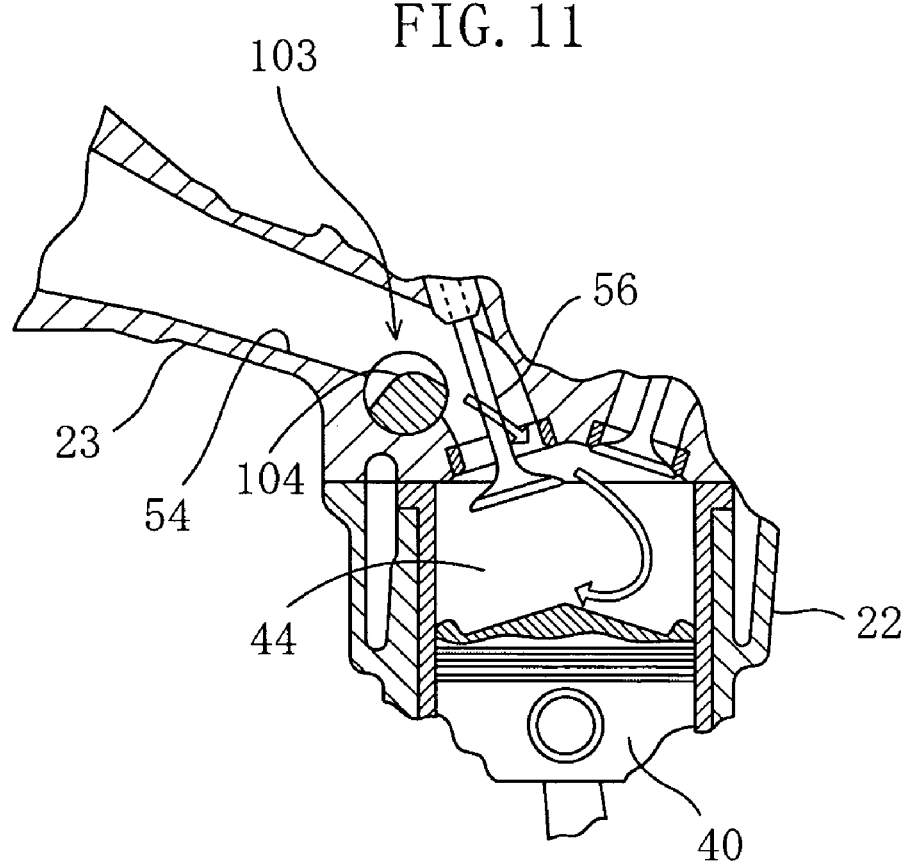
FIG. 11 is a cross sectional view taken along the line XI—XI in FIG. 10.

As shown in FIG. 11, recesses 104 are formed on those portions of the control valve 103 which are disposed in the intake ports 54. When the control valve 103 rotates, the recesses 104 are changed in positions so that the intake ports 54 are varied in flow passage area. For example, when the control valve 103 rotates to partially close lower flow passage portions of the intake ports 54, only upper portions of the intake ports are opened leading to a decrease in flow passage area. Thereby, tumble flows are liable to be formed in a combustion chamber 44.

As shown in FIG. 10, the throttle body 101 is provided with a throttle valve 110. The throttle valve 110 includes a valve shaft 112 that extends through the throttle body 101, a valve plate 113 bolted to the valve shaft 112, and a connection 114 provided at a tip end of the valve shaft 112. A drive cable or the like is connected to the connection 114, and the throttle body 101 receives a drive force from the drive cable or the like to be rotated.

Figure 12:
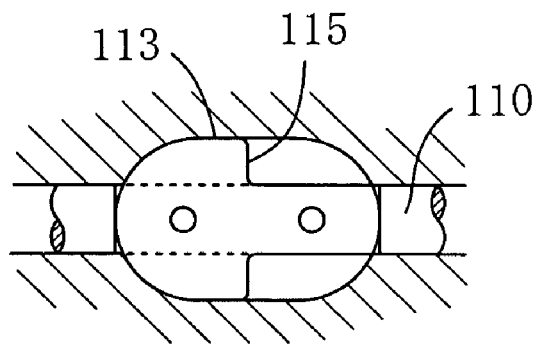
FIG. 12 is a cross sectional view taken along the line XII—XII in FIG. 10.

As shown in FIG. 12, the portion of the valve plate 113, which corresponds to one of the intake ports 54, is formed with a notch 115. Therefore, when the throttle valve 110 is turned, switching is made between an opened state, in which the both intake ports 54 are opened, and a closed state (a state shown in FIG. 12), in which one of the intake ports 54 is opened and the other is closed. In the closed state, the air-fuel mixture flows into the combustion chamber 44 only through one of intake openings 52, so that swirl flows are formed in the combustion chamber 44.

In addition, according to the present preferred embodiment, the control valve 103 and the throttle valve 110 may generate tumble flows or swirl flows separately in the combustion chamber 44, and can also generate vortex flows, in which tumble flows and swirl flows mix with each other.

According to the present preferred embodiment, the intake openings 52 and the exhaust openings 53, respectively, are preferably arranged two by two. However, the intake openings 52 and the exhaust openings 53 are not limited in number and arrangement. Also, the intake openings 52 and the exhaust openings 53 may be different in number from each other. Likewise, the intake valves 56 and the exhaust valves 57 are not limited in number.

The present invention is not limited to the preferred embodiments described above, but various variations and modifications may be made without departing from the scope of the present invention. The presently disclosed preferred embodiments are therefore considered in all respects to be illustrative and not restrictive. The scope of the present invention is indicated by the appended claims rather than the foregoing description, and all changes which come within the meaning and range of equivalence thereof are intended to be embraced therein.

What is claimed is:

1. A single cylinder engine comprising:
    an engine body including a cylinder, a combustion chamber, an intake opening that faces the combustion chamber, and an intake passage in communication with the combustion chamber through the intake opening;
    a piston provided in the cylinder;
    an ignition plug arranged in a position within about 5% of a bore diameter of the cylinder from an axis of the cylinder;
    a throttle valve provided in the intake passage;
    an injector that injects a fuel into the intake passage;
    a detection device that detects an opening degree of the throttle valve and an increasing rate of the opening degree of the throttle valve; and
    a control device that causes the ignition plug to lag in ignition timing during two or three cycles when the throttle valve is increased in opening degree from an idling state; wherein
    when the increasing rate of the opening degree of the throttle valve is a predetermined value or more, the control device causes ignition timing to lag and increases a fuel injection quantity of the injector during the two or three cycles.

2. The single cylinder engine according to claim 1, wherein the engine body comprises an intake port that defines at least a portion of the intake passage and generates vortex flows in the combustion chamber.

3. The single cylinder engine according to claim 1, wherein the engine body comprises a vortex flow generating mechanism that causes a sucked gas, which flows into the combustion chamber from the intake passage, to generate vortex flows in the combustion chamber.

4. The single cylinder engine according to claim 1, wherein the engine body comprises an intake drifting mechanism that causes a sucked gas, which flows into the combustion chamber from the intake passage, to drift toward the axis of the cylinder in the intake opening.

5. The single cylinder engine according to claim 1, wherein an air-fuel ratio in the idling state is substantially equal to a theoretical air-fuel ratio.

6. The single cylinder engine according to claim 5, wherein a volume ratio Q/V of a volume Q of that portion of the intake passage, which extends from the throttle valve to the intake opening, to a stroke volume V of the cylinder is at most about 0.61.

7. The single cylinder engine according to claim 1, wherein a compression ratio is about 12 or more.

8. The single cylinder engine according to claim 1, wherein the control device causes only the ignition timing to lag when the increasing rate of the opening degree of the throttle valve is below the predetermined value.

9. A vehicle comprising:
a vehicle body;
a wheel mounted to the vehicle body; and
a single cylinder engine that drives the wheel, the single cylinder engine including:
an engine body having a cylinder, a combustion chamber, an intake opening that faces the combustion chamber, and an intake passage in communication with the combustion chamber through the intake opening;
a piston provided in the cylinder;
an ignition plug arranged in a position within about 5% of a bore diameter of the cylinder from an axis of the cylinder;
a throttle valve provided in the intake passage;
an injector that injects a fuel into the intake passage;
a detection device that detects an opening degree of the throttle valve and increasing rate of the opening degree of the throttle valve; and
a control device that causes the ignition plug to lag in ignition timing during two or three cycles when the throttle valve is increased in opening degree from an idling state; wherein
when the increasing rate of the opening degree of the throttle valve is a predetermined value or more, the control device causes ignition timing to lag and increases a fuel injection quantity of the injector during the two or three cycles.

10. The vehicle according to claim 9, wherein the control device causes only the ignition timing to lag when the increasing rate of the opening degree of the throttle valve is below the predetermined value.

* * * * *